United States Patent
Do et al.

(10) Patent No.: US 12,338,323 B2
(45) Date of Patent: *Jun. 24, 2025

(54) METHOD FOR PREPARING POLYAMIDE BY ANION RING-OPENING POLYMERIZATION AND POLYAMIDE PREPARED THEREBY

(71) Applicant: HANWHA SOLUTIONS CORPORATION, Seoul (KR)

(72) Inventors: Seung Hoe Do, Daejeon (KR); Jin Seo Lee, Seongnam-si (KR); Kyung Ho Kwon, Daegu (KR); Do Kyoung Kim, Busan (KR); Hye Yeon Lee, Seoul (KR); Kyoung Won Yim, Gwangju (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 467 days.

This patent is subject to a terminal disclaimer.

(21) Appl. No.: 16/762,725

(22) PCT Filed: Nov. 5, 2018

(86) PCT No.: PCT/KR2018/013328
§ 371 (c)(1),
(2) Date: May 8, 2020

(87) PCT Pub. No.: WO2019/093729
PCT Pub. Date: May 16, 2019

(65) Prior Publication Data
US 2020/0270397 A1    Aug. 27, 2020

(30) Foreign Application Priority Data
Nov. 8, 2017 (KR) .................. 10-2017-0148304
Nov. 2, 2018 (KR) .................. 10-2018-0133921

(51) Int. Cl.
  C08G 69/18    (2006.01)
  C08K 3/12     (2006.01)
  C08K 3/20     (2006.01)
  C08K 5/20     (2006.01)
  C08K 5/21     (2006.01)

(52) U.S. Cl.
CPC ............. *C08G 69/18* (2013.01); *C08K 3/12* (2013.01); *C08K 3/20* (2013.01); *C08K 5/20* (2013.01)

(58) Field of Classification Search
CPC .. C08G 69/18; C08K 3/12; C08K 3/20; C08K 5/20; C08K 5/21
See application file for complete search history.

(56) References Cited

U.S. PATENT DOCUMENTS

| | | | |
|---|---|---|---|
| 3,423,372 A | 1/1969 | Steely | |
| 3,484,415 A | 12/1969 | Sahler | |
| 3,878,173 A | 4/1975 | Biensan et al. | |
| 3,883,608 A | 5/1975 | Hebert | |
| 4,067,861 A | 1/1978 | Biensan et al. | |
| 4,171,425 A | 10/1979 | Lew | |
| 4,739,007 A * | 4/1988 | Okada | C08L 77/02 524/789 |
| 4,754,000 A | 6/1988 | Meyer et al. | |
| 5,362,448 A | 11/1994 | Kawakami et al. | |
| 5,519,097 A | 5/1996 | Meyer et al. | |
| 5,747,634 A | 5/1998 | Schmid et al. | |
| 6,579,965 B2 | 6/2003 | Hoogen et al. | |
| 6,713,596 B1 | 3/2004 | Faulhammer et al. | |
| 7,135,428 B2 | 11/2006 | Schmid et al. | |
| 2005/0197446 A1* | 9/2005 | Loyen | B82Y 30/00 524/495 |
| 2014/0048738 A1* | 2/2014 | Xia | B01J 2/00 977/783 |
| 2016/0102175 A1 | 4/2016 | Schmidt et al. | |
| 2016/0297930 A1 | 10/2016 | Lee et al. | |

FOREIGN PATENT DOCUMENTS

| | | | | |
|---|---|---|---|---|
| EP | 0 156 129 A1 | 10/1985 | | |
| EP | 1 091 991 B1 | 11/2003 | | |
| EP | 1571173 A1 * | 9/2005 | ............ | B82Y 30/00 |
| JP | 47-26678 A | 7/1972 | | |
| JP | 5-17574 A | 1/1993 | | |
| JP | H06322109 A * | 11/1994 | | |
| JP | 2002-540273 A | 11/2002 | | |
| JP | 2012-017476 A | 1/2012 | | |
| KR | 10-2013-0015154 A | 2/2013 | | |
| KR | 10-2013-0097294 A | 9/2013 | | |
| KR | 10-2014-0115171 A | 9/2014 | | |

(Continued)

OTHER PUBLICATIONS

Machine translation into Englsh of EP-1571173-A1; Francois et al (Year: 2005).*

(Continued)

*Primary Examiner* — Karuna P Reddy
(74) *Attorney, Agent, or Firm* — Sughrue Mion, PLLC

(57) ABSTRACT

Provided is a method for preparing a polyamide by an anionic polymerization reaction, wherein lactam, and based on 100 parts by weight of the entire lactam, 0.01 parts by weight to 20 parts by weight of an alkali metal as an initiator, 0.3 parts by weight to 10 parts by weight of a molecular weight controller, and 0.002 parts by weight to 1.0 part by weight of carbon dioxide as an activator may be included.

12 Claims, 2 Drawing Sheets

(56) References Cited

FOREIGN PATENT DOCUMENTS

| KR | 10-2015-0065080 A | 6/2015 |
|---|---|---|
| KR | 10-2016-0083649 A | 7/2016 |

OTHER PUBLICATIONS

Machine translation into English of JP-H06322109-A; Hashimoto et al (Year: 1994).*
International Search Report for PCT/KR2018/013328 dated Apr. 12, 2019 (PCT/ISA/210).
Written Opinion of the International Search Authority for PCT/KR2018/013328 dated Apr. 12, 2019 (PCT/ISA/237).
Chrzczonowicz et al., "Polymerization of [epsilon]-caprolactam and [zeta]-enantholactam in Non-Polar Solvents", From the Department of Organic Technology, Laboratory of Plastics Technology, Institute of Technology, Die Makromolekulare Chemie, Jan. 1960, pp. 159-167 (9 pages).

* cited by examiner

METHOD FOR PREPARING POLYAMIDE BY ANION RING-OPENING POLYMERIZATION AND POLYAMIDE PREPARED THEREBY

CROSS REFERENCE TO RELATED APPLICATIONS

This application is a National Stage of International Application No. PCT/KR2018/013328 filed Nov. 5, 2018, claiming priorities based on Korean Patent Application No. 10-2017-0148304 filed Nov. 8, 2017 and Korean Patent Application No. 10-2018-0133921 filed Nov. 2, 2018, the disclosures of which are incorporated by reference in their entireties.

TECHNICAL FIELD

The present invention relates to a method for preparing a polyamide by anionic ring-opening polymerization and a polyamide prepared thereby, and more particularly, to a method for preparing a polyamide by anionic ring-opening polymerization and a polyamide prepared thereby, wherein the method is an eco-friendly processing method not using a solvent as a catalyst and enables polymerization to a uniform molecular weight with a high conversion rate in a short polymerization reaction time at a low temperature, compared with an existing polymerization method.

BACKGROUND ART

A polyamide resin is a linear polymer bonded by an amide (—NHCO—) bond. The polyamide resin is strong, has excellent physical properties in terms of friction resistance, abrasion resistance, oil resistance, and solvent resistance, and is easily melt-molded. Therefore, the polyamide resin is widely used as clothing materials, fibers for industrial materials, engineering plastics, and the like. Polyamides may be classified into aliphatic polyamides, aromatic polyamides, and aliphatic cyclic polyamides according to molecular structures. The aliphatic polyamides may be collectively referred to as nylon, and the aromatic polyamides may be collectively referred to as aramid.

Polyamides are prepared by various polymerization methods and may be classified into those prepared by ring-opening polymerization of lactam, such as nylon 6, those prepared by polycondensation of diamines and dibasic acids, such as nylon 6,6, nylon 6,10 and nylon 4,6, and those prepared by polycondensation of aminocarboxylic acids, such as nylon 11 and nylon 12. Furthermore, so-called hybrid polymerized nylons, such as hybrid condensates of caprolactam and 6,10-nylon salts (hexamethylenediamine and sebacate), are industrially produced, and various polyamides including functional groups such as side chains and hydroxyl groups, aromatic rings and, hetero rings in molecules have been studied.

Lactams, for example, caprolactam may be anionically polymerized. This method generally uses a catalyst and an initiator (also referred to as an activator) (activated anionic polymerization). Initiators or activators frequently used till now include diisocyanates or derivatives thereof.

U.S. Pat. No. 4,754,000 (Bayer AG) discloses activated anionic polymerization of lactams, which produces polyamides using biuret-group-containing polyisocyanates derived from non-aromatic diisocyanates as an activator.

EP 1091991 (BASF AG) discloses a composition including polyisocyanurates having more than 3.5 NCO functional groups on average as a component A and a method for preparing a surface coating composition using the composition.

In U.S. Pat. No. 3,423,372, uncapped polyisocyanates are used (resulting in a significant reduction in reactivity), and an activator concentration in that example is very low (1/200 mol to 1/50 mol). Polymerization takes more than 3 minutes at the concentration used in this U.S. patent.

In EP 0156129, a rubber (i.e., elastomer) is used as a precursor of a multifunctional activator. Therefore, the resulting PA is up to 1.12 GPa and is not rigid. The activator has a high weight average molecular weight (Mw). In this case, a large amount of activator is required (20% or more). A mixture of a bifunctional activator and a multifunctional activator is used. Therefore, the resulting polyamide is not a crosslinked material.

In addition, U.S. Pat. No. 4,067,861 (1978) discloses a technology for anionic polymerization of lactams through an extruder. A metering pump is installed between an extruder body and an extruder die so as to obtain a constant output and uniform viscosity and physical properties. Although attempting to mechanically solve viscosity non-uniformity, this is not a fundamental solution.

U.S. Pat. No. 3,878,173 (1975) points out the problem of unstable viscosity due to thermal decomposition and the formation of a structurally disorderly branching structure. However, in order to prevent decomposition of a synthesized polymer, an attempt to solve the problem is made just by using a more acidic additive. This U.S. patent does not disclose the solution to the non-uniform branching structure. For reference, a branching side reaction that occurs during polyamide anionic polymerization is discussed in detail in M. P. Stevens, "Polymer Chemistry", 2nd Ed., Oxford University Press, p 429 (1990) and G. Odian, "Principles of Polymerization", 2nd Ed., John Wiley & Sons, p541 (1981).

In particular, in U.S. Pat. No. 5,747,634 (1998), a solution liquid system containing a catalyst and an initiator (reaction accelerator) at the same time is introduced so as to obtain a more uniform product. U.S. Pat. No. 5,747,634 discloses that the solution liquid system is introduced to obtain uniform products with a constant quality and a high reproducibility result, but there is a problem that is not efficient due to a problem of solvent removal when applying to a reaction extrusion method.

PRIOR ART DOCUMENTS

Patent Documents (Patent Document 1) U.S. 2016-0102175
(Patent Document 2) U.S. Pat. No. 5,519,097
(Patent Document 3) U.S. Pat. No. 3,883,608
(Patent Document 4) U.S. Pat. No. 7,135,428
(Patent Document 5) U.S. Pat. No. 5,362,448

DESCRIPTION OF EMBODIMENTS

Technical Problem

The present invention aims to solve the above-described problems of the related art and the technical problems requested from the past.

An object of the present invention is to provide a method for preparing a polyamide by anionic ring-opening polymerization and a polyamide prepared thereby, wherein the method is an eco-friendly processing method not using a solvent as a catalyst and enables polymerization to a uniform molecular weight with a high conversion rate in a short polymerization reaction time at a low temperature, compared with an existing polymerization method.

Solution to Problem

To achieve the object, the present invention provides a method for preparing a polyamide by anionic ring-opening polymerization, wherein lactam, and based on 100 parts by weight of the entire lactam, 0.01 parts by weight to 20 parts by weight of an alkali metal as an initiator, 0.3 parts by weight to 10 parts by weight of a molecular weight controller, and 0.002 parts by weight to 1.0 part by weight of carbon dioxide as an activator are included.

In one preferred embodiment of the present invention, the lactam may include at least one selected from the group consisting of caprolactam, laurolactam, pyrrolidone, and piperidinone.

More specifically, the lactam may include two types of lactams, and an amount of at least one of the lactams may be 50 parts by weight or more based on 100 parts by weight of the entire lactams.

According to the present invention, since carbon dioxide is used as an activator without using a solvent as a catalyst, the polyamide having a polydispersity index (PDI) with a narrow molecular weight distribution may be prepared through an appropriate amount of a molecular weight controller during polymerization.

In one preferred embodiment of the present invention, the alkali metal may include at least one selected from the group consisting of metal hydride, metal hydroxide, and metal alkoxide.

In one preferred embodiment of the present invention, the molecular weight controller may include at least one selected from the group consisting of ethylene-bis-stearamide (EBS), an amine compound, a urea compound, and a di-urea compound.

In one preferred embodiment of the present invention, the polymerization reaction may be performed within a range of 0.5 minutes to 120 minutes at a temperature range of 180° C. to 250° C. based on an experimental reactor. The polymerization reaction time is not particularly limited and may be appropriately adjusted according to a weight of a compound introduced or a size and a type of the reactor.

In one preferred embodiment of the present invention, the lactam in the polymerization reaction may have a conversion rate of 95% or more to the polyamide.

The present invention provides a polyamide prepared by the above-described method.

In one preferred embodiment of the present invention, the polyamide may have a PDI of 3.0 or less.

In one preferred embodiment of the present invention, a weight average molecular weight (Mw) of the polyamide may be in a range of 40,000 to 80,000.

In one preferred embodiment of the present invention, the polyamide may have a linear, branched, hyperbranched, or dendritic structure.

The present invention provides a parts material selected from the group consisting of a vehicle material, an electronic device material, an industrial pipe material, a construction engineering material, a 3D printer material, a textile material, a cladding material, a machine tool material, a medical material, an aviation material, a photovoltaic material, a battery material, a sports material, a household appliance material, a household material, and a cosmetic material, which each include the polyamide.

In a specific example, a product including the parts material may be vehicle air ducts, plastic/rubber compounds, adhesives, lights, polymer optical fibers, fuel filter caps, line systems, cables for electronic devices, reflectors, sheaths of cables, optical fibers, wire protection tubes, control units, pipe tubes, liners, pipe coatings, oilfield exploration hoses, 3D printers, multifilaments, spray hoses, valves, ducts, pulps, gears, medical catheters, flame retardants for aircraft, solar cell protection plates, cosmetic materials, high hardness films, ski boots, headsets, glasses frames, toothbrushes, water bottles, or outsoles, but the present invention is not limited thereto.

Advantageous Effects of Disclosure

As described above, the present invention is an eco-friendly processing method not using a solvent as a catalyst and enables polymerization to a uniform molecular weight with a high conversion rate in a short polymerization reaction time at a low temperature, compared with an existing polymerization method.

BEST MODE

Figure 1:
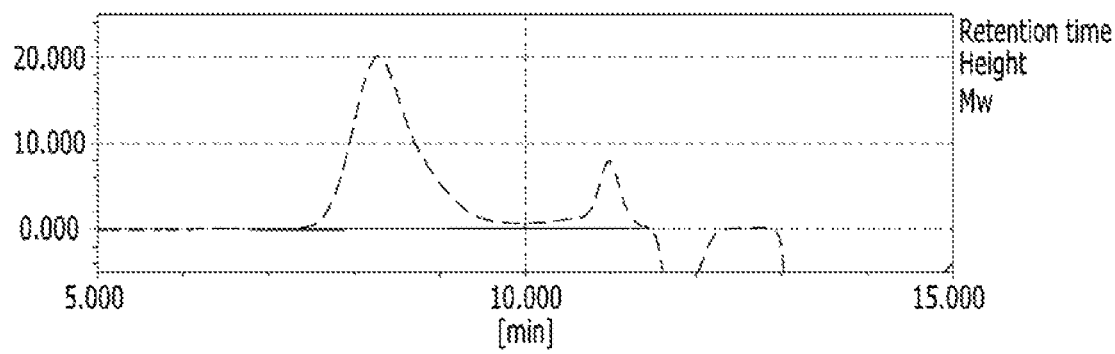
FIG. 1 is a graph showing a result of GPC analysis of a polymerization sample prepared according to the present invention.

The present invention will be described with reference to specific embodiments and the accompanying drawings. The embodiments will be described in detail in such a manner that the present invention may be carried out by those of ordinary skill in the art. It should be understood that various embodiments of the present invention are different, but need not be mutually exclusive. For example, certain shapes, structures, and features described herein may be implemented in other embodiments without departing from the spirit and scope of the present invention in connection with one embodiment.

Therefore, the following detailed description is not to be taken in a limiting sense, and the scope of the present invention is to be limited only by the appended claims and the entire scope of equivalents thereof, if properly explained.

In addition, unless otherwise specified in the present specification, the term "substitution" or "substituted" means that one or more hydrogen atoms in the functional groups of the present invention are substituted with one or more substituents selected from the group consisting of a halogen atom (—F, —Cl, —Br, or —I), a hydroxy group, a nitro group, a cyano group, an amino group, an amidino group, a hydrazine group, a hydrazone group, a carboxyl group, an ester group, a ketone group, a substituted or unsubstituted alkyl group, a substituted or unsubstituted alicyclic organic group, a substituted or unsubstituted aryl group, a substituted or unsubstituted alkenyl group, a substituted or unsubstituted alkynyl group, a substituted or unsubstituted heteroaryl group, and a substituted or unsubstituted heterocyclic group. These substituents may be linked to each other to form a ring.

In the present invention, unless otherwise specified, the term "substituted" means that a hydrogen atom is substituted with a substituent such as a halogen atom, a $C_1$-$C_{20}$hydrocarbon group, a $C_1$-$C_{20}$alkoxy group, and a $C_6$-$C_{20}$aryloxy group.

In addition, unless otherwise specified, the term "hydrocarbon group" refers to a linear, branched, or cyclic saturated or unsaturated hydrocarbon group, and the alkyl group. The alkenyl group, the alkynyl group, and the like may be linear, branched, or cyclic.

In addition, unless otherwise specified in the present specification, the term "alkyl group" refers to a $C_1$-$C_{30}$alkyl group and the term "aryl group" refers to a $C_6$-$C_{30}$aryl group. In the present specification, the term "heterocyclic group" refers to a group in which one to three heteroatoms selected from the group consisting of O, S, N, P, Si, and any combination thereof are contained in one ring. Examples of the heterocyclic group may include pyridine, thiophene, and pyrazine, but the present invention is not limited thereto.

Hereinafter, embodiments of the present invention will be described with reference to the accompanying drawings, so that those of ordinary skill in the art can easily carry out the present invention.

As described above, there have been limitations in limiting the inefficiency of the processing, which is caused by the problems occurring in hydrolytic polymerization, catalytic ring-opening polymerization, and anionic ring-opening polymerization among the conventional polyamide polymerization methods, and the increase in viscosity due to side reactions at high temperature polymerization.

The present invention is an eco-friendly processing method using carbon dioxide ($CO_2$) instead of a solvent as a catalyst and enables polymerization to a uniform molecular weight with a high conversion rate in a short polymerization reaction time at a low temperature, compared with an existing polymerization method, thereby providing the solution to the above-described problems.

A method for preparing a polyamide by an anionic polymerization reaction according to the present invention is a method for preparing a polyamide by anionic ring-opening polymerization, wherein lactam, and based on 100 parts by weight of the entire lactam, 0.01 parts by weight to 20 parts by weight of an alkali metal as an initiator, 0.3 parts by weight to 10 parts by weight of a molecular weight controller, and 0.002 parts by weight to 1.0 part by weight of carbon dioxide as an activator are included.

Specifically, compositions included in the preparation of the polyamide by the anionic ring-opening polymerization according to the present invention will be described below.

The lactam according to the present invention may be preferably used as a monomer for preparing the polyamide. However, the present invention is not limited thereto. The lactam may contain 4 to 12 carbon atoms in the ring. For example, the lactam may include caprolactam, piperidone, pyrrolidone, enantolactam, and caprylactam. In some cases, the lactam may include propiolactam, 2-pyrrolidone, valerolactam, caprolactam, heptanolactam, octanolactam, nonanolactam, decanolactam, undecanolactam, and dodecanolactam.

The lactam according to the present invention may include at least one selected from the group consisting of caprolactam, laurolactam, pyrrolidone, and piperidinone. For example, a mixture of caprolactam and laurolactam may be used, but the present invention is not limited thereto.

The lactam may include two types of lactams. An amount of at least one of the lactams may be 50 parts by weight or more based on 100 parts by weight of the entire lactams.

For example, the lactam may include two types of lactams. The two types of lactams may be caprolactam and laurolactam. An amount of one of the lactams may be 50 parts by weight or more. For example, the lactam may include 90 parts by weight of caprolactam and 10 parts by weight of laurolactam. However, this is only an example, and the present invention is not limited thereto.

The alkali metal catalyst according to the present invention is an initiator for preparing the polyamide and may include at least one selected from the group consisting of metal hydride, metal hydroxide, and metal alkoxide as a compound that allows the formation of the lactam anion.

In a specific example, the metal hydride may include sodium hydride and potassium hydride, the metal hydroxide may include sodium hydroxide and potassium hydroxide, and the metal alkoxide may include potassium tetra-butoxide and aluminum isopropoxide, but the present invention is not limited thereto.

The metal alkoxide may include sodium caprolactamate or potassium caprolactamate, alkaline earth metal caprolactamate, for example, magnesium bromide caprolactamate, magnesium chloride caprolactamate, or magnesium biscaprolactamate, an alkali metal, for example, sodium or potassium, alkali metal base, for example, sodium base, for example sodium hydride, sodium, sodium hydroxide, sodium methanolate, sodium ethanolate, sodium propanolate, or sodium butanolate, or at least one selected from the group consisting of potassium base, for example potassium hydride, potassium, potassium hydroxide, potassium methanolate, potassium ethanolate, potassium propanolate, potassium butanolate, or any mixture thereof, and preferably at least one selected from the group consisting of sodium caprolactate, potassium caprolactate, magnesium bromide caprolactate, magnesium chloride caprolactate, magnesium biscaprolactate, sodium hydride, sodium, sodium hydroxide, sodium ethanolate, sodium methanolate, sodium propanolate, sodium butanolate, potassium hydride, potassium, potassium hydroxide, potassium methanolate, potassium ethanolate, potassium propanolate, potassium butanolate, and any mixture thereof. In addition, at least one selected from the group consisting of sodium hydride, sodium, sodium caprolactamate, and any mixture thereof may be included.

The metal catalyst may be used in the form of a solid or a solution, and the catalyst is preferably used in the form of a solid. The catalyst is preferably added to a laurolactam melt in which the catalyst can be dissolved. These catalysts lead to particularly rapid reactions, thereby increasing the efficiency of the process for preparing the polyamide according to the invention.

According to the present invention, an amount of the alkali metal catalyst may be in a range of 0.01 parts by weight to 20 parts by weight based on 100 parts by weight of the entire lactam. The amount of the alkali metal catalyst may be in a range of preferably 0.03 parts by weight to 10 parts by weight, and more preferably 0.05 parts by weight to 5.0 parts by weight.

In this case, when the alkali metal catalyst is added in an amount of less than 0.01 parts by weight, unpolymerization may occur or a reaction rate may decrease. When the amount of the alkali metal catalyst exceeds 20 parts by weight, a low-molecular-weight polymer may be generated. Therefore, the above range is preferable.

Next, the molecular weight controller according to the present invention may be preferably ethylene-bis-stearamide (EBS), but the present invention is not limited thereto. The molecular weight controller may include at least one selected from the group consisting of an amine compound, a urea compound, and a di-urea compound.

According to the present invention, an amount of the molecular weight controller may be in a range of 0.3 parts by weight to 10 parts by weight based on 100 parts by weight of the entire lactam. The amount of the molecular weight controller may be in a range of preferably 0.4 parts by weight to 7.0 parts by weight, and more preferably 0.5 parts by weight to 3.0 parts by weight.

In this case, when the molecular weight controller is added in an amount of less than 0.3 parts by weight, a high-molecular-weight polymer may be generated or a gelation problem may occur. When the amount of the molecular weight controller exceeds 10 parts by weight, a low-molecular-weight polymer may be generated or unpolymerization may occur. Therefore, the above range is preferable.

Finally, according to the invention, the activator may preferably be carbon dioxide ($CO_2$), but the present invention is not limited thereto. For example, the activator may include at least one selected from the group consisting of benzoyl chloride, N-acetyl caprolactam, N-acetyl laurolactam, octadecyl isocyanate (SIC), toluene diisocyanate (TDI), and hexamethylene diisocyanate (HDI).

According to the present invention, an amount of the carbon dioxide may be in a range of 0.002 parts by weight to 1.0 part by weight based on 100 parts by weight of the entire lactam. The amount of the carbon dioxide may be in a range of preferably 0.005 parts by weight to 5 parts by weight, and more preferably 0.01 parts by weight to 0.1 parts by weight.

In this case, when the carbon dioxide is added in an amount of less than 0.002 parts by weight, unpolymerization may occur or a reaction rate may decrease. When the amount of the carbon dioxide exceeds 1.0 part by weight, a gelation problem may occur. Therefore, the above range is preferable.

Hereinafter, preferred examples are presented so as to help the understanding of the present invention. However, the following examples are for illustrative purposes only and the present invention is not limited by the following examples.

EXAMPLES

Example 1

Preparation of polymerization samples using carbon dioxide ($CO_2$) as activator In order to remove moisture from a flask, a vacuum was released from the flask that was maintained at 60° C. in a vacuum state. 20 g of laurolactam, 0.15 g of EBS, and 0.02 g of NaH were added to the flask and the temperature was raised to 160° C. under vacuum. Then, the reaction temperature was set to 230° C. and nitrogen gas was added thereto. Hydrogen gas generated while the materials were molten was removed. 1.7 ml of carbon dioxide was injected and reacted for 30 minutes. Finally, after 30 minutes, an aqueous formic acid solution (formic acid:distilled water=1:1) was added to the flask to terminate the reaction. Samples having contents shown in Table 1 were collected. Using this, a molecular weight and a polydispersity index (PDI) were confirmed and the results thereof are shown in Table 2 below.

TABLE 1

| | Lactam (g) | Alkali metal (g) | Molecular weight controller (g) | Amount of $CO_2$ (ml) |
|---|---|---|---|---|
| Example 1 | Laurolactam 20 | 0.02 | 0.15 | 1.7 |
| Example 2 | Laurolactam 20 | 0.04 | 0.30 | 3.4 |
| Example 3 | Laurolactam 20 | 0.002 | 0.15 | 1.7 |
| Example 4 | Laurolactam 20 | 0.05 | 0.15 | 1.7 |
| Example 5 | Laurolactam 20 | 0.09 | 0.15 | 1.7 |
| Example 6 | Laurolactam 20 | 0.02 | 0.05 | 1.7 |
| Example 7 | Laurolactam 20 | 0.02 | 0.6 | 1.7 |
| Example 8 | Laurolactam 20 | 0.02 | 0.9 | 1.7 |
| Example 9 | Laurolactam 20 | 0.02 | 0.15 | 0.2 |
| Example 10 | Laurolactam 20 | 0.02 | 0.15 | 6 |
| Example 11 | Laurolactam 20 | 0.02 | 0.15 | 100 |
| Example 12 | Laurolactam 2 Caprolactam 18 | 0.04 | 0.30 | 3.4 |
| Comparative Example 1 | 20 | 0.02 | — | 1.7 |
| Comparative Example 2 | 20 | 0.02 | 0.15 | — |
| Comparative Example 3 | 20 | — | 0.15 | 1.7 |

Example 2

Preparation of polymerization samples using carbon dioxide ($CO_2$) as activator A polymerization sample was prepared in the same manner as in Example 1, except that 0.30 g of EBS and 0.04 g of NaH were added.

Examples 3 to 11

Polymerization samples were prepared in the same manner as in Example 1, except that the content ratios of the compositions were different as shown in Table 1.

Example 12

A polymerization sample was prepared in the same manner as in Example 2, except that 2 g of laurolactam and 18 g of caprolactam were added as the monomer.

COMPARATIVE EXAMPLES

Comparative Example 1

A polymerization sample was prepared in the same manner as in Example 1, except that EBS was not used.

Comparative Example 2

A polymerization sample was prepared in the same manner as in Example 1, except that the reaction was performed for 30 minutes without injecting carbon dioxide.

Comparative Example 3

A polymerization sample was prepared in the same manner as in Example 1, except that NaH was added.

TABLE 2

| | Molecular weight (g/mol) | Polydispersity index (PDI) | Polymerization |
|---|---|---|---|
| Example 1 | 73,500 | 2.5 | Polymerization |
| Example 2 | 53,900 | 2.5 | Polymerization |
| Example 3 | — | — | Unpolymerization |
| Example 4 | 43,000 | — | Polymerization |
| Example 5 | 20,000 | — | Polymerization |
| Example 6 | >160,000 | — | Gelation |
| Example 7 | 18,000 | — | Polymerization |
| Example 8 | 12,000 | — | Polymerization |
| Example 9 | — | — | Unpolymerization |
| Example 10 | 85,000 | 2.5 | Polymerization |
| Example 11 | >160,000 | — | Gelation |
| Example 12 | 48,000 | 2.5 | Polymerization |
| Comparative Example 1 | >160,000 | 6.5 | Gelation |
| Comparative Example 2 | — | — | Unpolymerization |
| Comparative Example 3 | — | — | Unpolymerization |

As shown in Table 2, Example 5 in which 0.09 g of NaH was included with respect to the laurolactam had a slightly lower molecular weight, compared with Examples 1 to 4. Example 8 in which 0.9 g of EBS was included with respect to the laurolactam had a lower molecular weight, compared with Examples 6 and 7, and Example 11 in which 12 ml of carbon dioxide ($CO_2$) was included with respect to the laurolactam had a higher molecular weight, compared with Examples 9 and 10.

In addition, in the case of Comparative Example 1 that did not include EBS as the molecular weight controller, a very wide PDI was shown, compared with Examples 1 to 11. In the case of Comparative Example 3 that did not include NaH as the alkali metal or Comparative Example 2 that did not include carbon dioxide as the activator, polymerization was not performed.

Finally, in the case of Example 12, even when the mixture of laurolactam and caprolactam was used as the monomer, it was confirmed that polymerization was performed at a level at which the molecular weight and the PDI were good.

As shown in FIG. 1, GPC analysis of the polymerization sample prepared as described above showed that the weight average molecular weight (Mw) was 73,500 and the PDI was 2.5.

Figure 2:
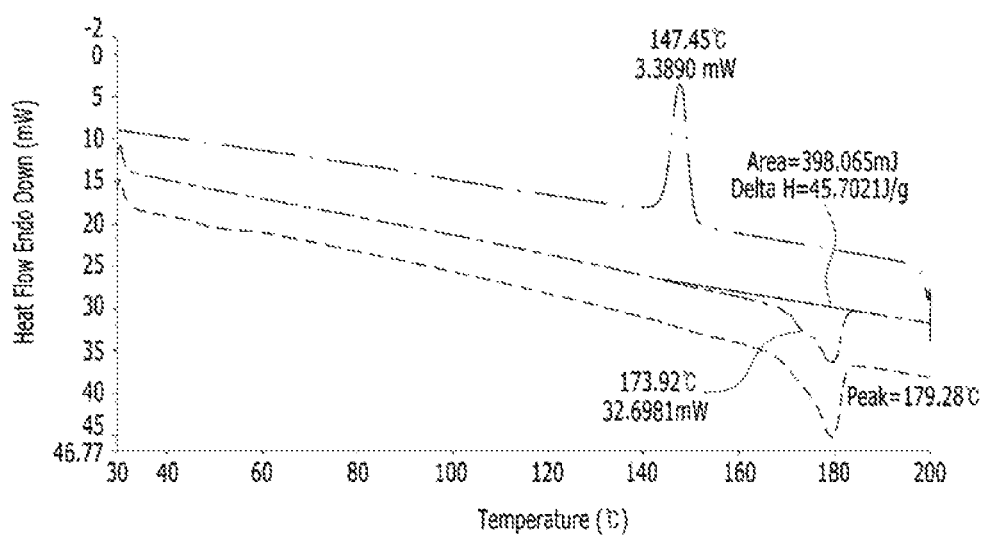
FIG. 2 is a graph showing a result of DSC analysis of a polymerization sample prepared according to the present invention.
Figure 3:
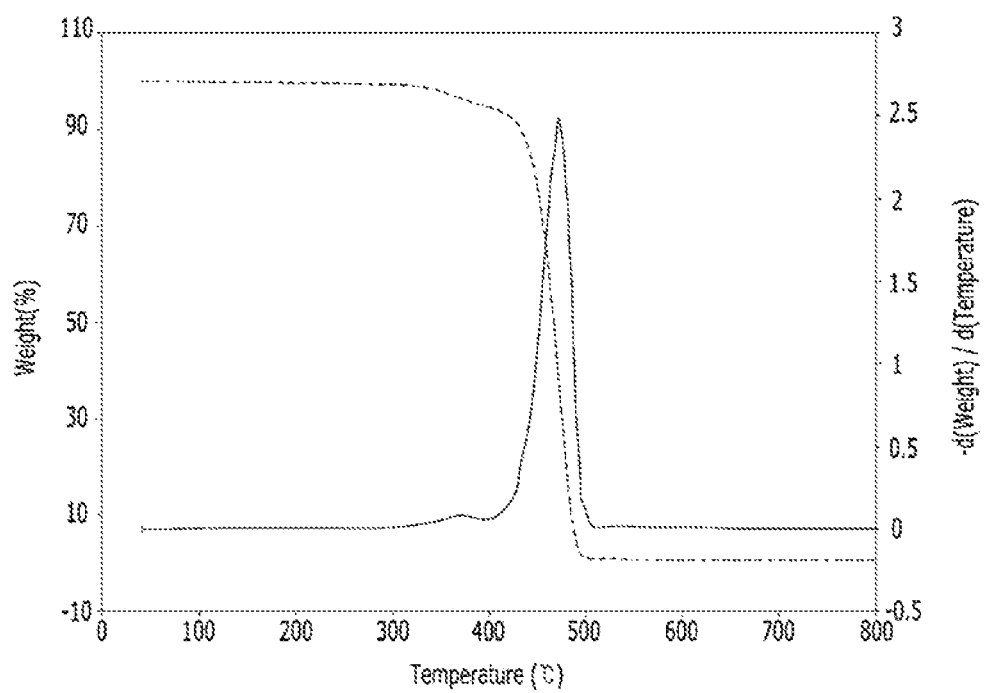
FIG. 3 is a graph showing a result of TGA analysis of a polymerization sample prepared according to the present invention.

Furthermore, as shown in FIGS. 2 to 3, DSC analysis of the polymerization sample showed that the Tm value was 179° C., the oligomer remaining after polymerization was 5.1%, and the polymerization conversion rate was approximately 95%.

Although the present invention has been described with reference to the drawings according to embodiments of the present invention, it will be understood by those of ordinary skill in the art that various applications and modifications can be made thereto without departing from the scope of the present invention.

The invention claimed is:

1. A method for preparing a polyamide by an anionic polymerization reaction, said method comprising:
    subjecting a lactam compound to an anionic ring-opening polymerization to prepare the polyamide, in the presence of, based on 100 parts by weight of a total weight of the lactam compound, 0.01 parts by weight to 20 parts by weight of an alkali metal as an initiator, 0.3 parts by weight to 10 parts by weight of a molecular weight controller, and 0.002 parts by weight to 1.0 part by weight of carbon dioxide as an activator,
    wherein the molecular weight controller comprises one or more selected from the group consisting of a urea compound, and a di-urea compound,
    wherein the polyamide has a polydispersity index (PDI) of 2.5 or less, and
    wherein the anionic polymerization reaction is carried out in the absence of a solvent.

2. The method of claim 1, wherein the lactam compound comprises one or more selected from the group consisting of caprolactam, laurolactam, pyrrolidone, and piperidinone.

3. The method of claim 2, wherein the lactam compound comprises two different lactams, and an amount of at least one of the two different lactams is 50 parts by weight or more based on 100 parts by weight of the total weight of the lactam compound.

4. The method of claim 1, wherein the alkali metal comprises one or more selected from the group consisting of a metal hydride, a metal hydroxide, and a metal alkoxide.

5. The method of claim 1, wherein the anionic ring-opening polymerization reaction is performed within a range of 0.5 minutes to 120 minutes.

6. The method of claim 1, wherein the lactam compound in the anionic ring-opening polymerization reaction has a conversion rate of 95% or more to the polyamide.

7. The method of claim 1, wherein a polymerization temperature in the anionic ring-opening polymerization reaction is in a range of 180° C. to 300° C.

8. The method of claim 1, wherein the polyamide has a weight average molecular weight (Mw) ranging from 20,000 to 100,000.

9. The method of claim 1, wherein the polyamide has a linear, branched, hyperbranched, or dendritic structure.

10. The method of claim 1, wherein the anionic ring-opening polymerization reaction is performed within a range of 0.5 minutes to 30 minutes.

11. The method of claim 1, wherein the polyamide has a weight average molecular weight (Mw) ranging from 40,000 to 100,000.

12. The method of claim 1, wherein the polyamide has a weight average molecular weight (Mw) ranging from 73,000 to 100,000.

* * * * *